G. G. GREGORY.
BOTTLE.
APPLICATION FILED JULY 21, 1920.
1,416,347.
Patented May 16, 1922.
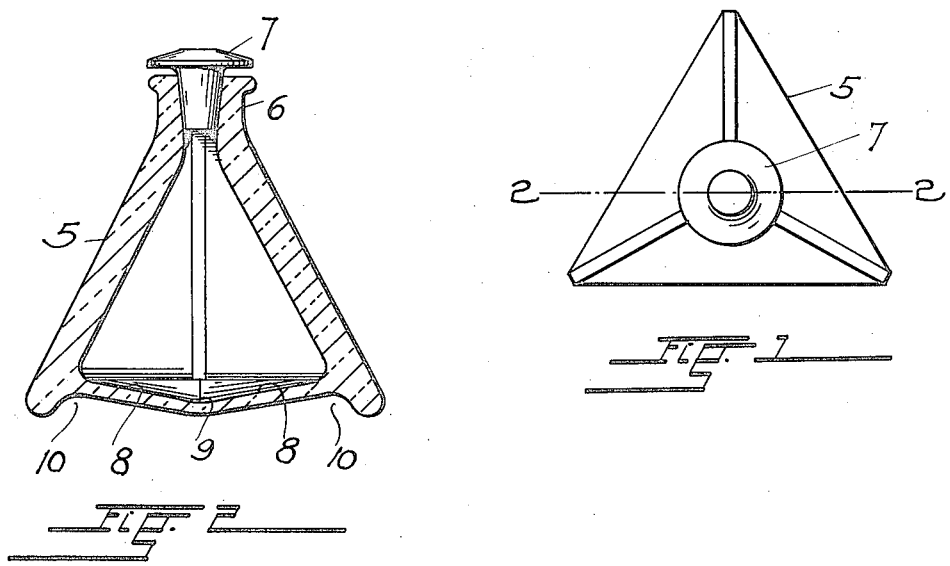
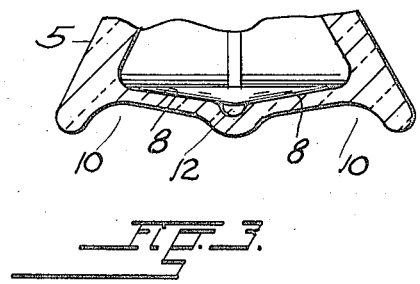
INVENTOR.
GEORGE G. GREGORY
BY
ATTORNEY.

UNITED STATES PATENT OFFICE.

GEORGE G. GREGORY, OF DENVER, COLORADO.

BOTTLE.

1,416,347. Specification of Letters Patent. Patented May 16, 1922.

Application filed July 21, 1920. Serial No. 397,867.

*To all whom it may concern:*

Be it known that I, GEORGE G. GREGORY, a citizen of the United States, residing at Denver, in the county of Denver and State of Colorado, have invented certain new and useful Improvements in Bottles, of which the following is a specification.

This invention relates to certain new and useful improvements in bottles and its primary object is to provide a bottle having in its inner bottom surface in vertical alinement with its mouth, a depression to collect the remainder of a liquid when the bottle is nearly empty.

Another object is to provide in a bottle of this character a bottom surface which slopes from the circumference thereof toward said depression and still another object is to provide a bottle the bottom portion of which is exteriorly of angular form to prevent its being overturned by the insertion of an instrument through its mouth.

My improved bottle is particularly adapted to contain liquid preparations such as those used in caring for the finger nails, which are removed from the bottle and applied by means of a stick of orange wood or other similar material inserted through the mouth thereof.

The provision of a depression as hereinbefore described permits of obtaining the last drop of liquid in the bottle by the ordinary procedure of inserting the stick in a substantially vertical direction and the angular form of the bottle prevents its being upset by contact of the stick with the interior surface of its neck as might readily occur unless great care is taken in manipulating the stick during its up and downward movement through the mouth of the bottle.

An embodiment of my invention has been illustrated in the accompanying drawings in the various views of which like parts are similarly designated, and in which—

Figure 1 is a top view of a bottle having the above stated improvements;

Figure 2, a section taken on the line 2—2, Figure 1, and

Figure 3, a fragmentary section of the bottom portion of the bottle showing a modification in its construction.

The bottle as shown in the drawings is of triangular pyramidal form and has at its apex an upwardly extending neck 6 adapted to be closed by a stopper 7.

The inner bottom surface 8 of the bottle slants from its sides toward a central point 9 in vertical alinement with the opening or mouth at the end of the neck thereby forming a depression at said point into which the last part of a liquid preparation can flow when the bottle is nearly empty. The exterior edges of the bottle are chamfered to prevent injuring the hands in its manipulation, and its outer bottom surface is preferably hollowed as at 10 to increase its stability.

In the form of my invention shown in Figure 3, the depression in the bottom surface is made in the form of a shallow cavity 12 which is alined with the mouth of the bottle as before and toward which the bottom surface slopes from its circumference.

It will be seen that the depression in conjunction with the sloping bottom surface of the bottle provides a convenient means for removing the liquid contents of the bottle by the use of a stick or similar instrument, to the very last drop and that the angular form of the bottle will effectively prevent its being overturned by careless manipulation of the stick while it is inserted or removed through the neck thereof.

Having thus described my invention what I claim and desire to secure by Letters-Patent is:

1. A bottle having a bottom surface directly beneath its mouth, the surface sloping gradually from the circumference of the bottle to a point in vertical alinement with the mouth, whereby to collect at said point a remainder of a liquid contents of the bottle when the bottle is mostly empty.

2. A bottle having a bottom surface directly beneath its mouth, the surface sloping gradually from the circumference of the bottle to a point in vertical alinement with the mouth, and having at said point, a depression wherein to collect a remainder of a liquid contents of the bottle when the bottle is mostly empty.

In testimony whereof I have affixed my signature.

GEORGE G. GREGORY.